US008991634B2

United States Patent
Grant et al.

(10) Patent No.: US 8,991,634 B2
(45) Date of Patent: Mar. 31, 2015

(54) SEAL RING FOR SEALING A CONTAINER

(71) Applicant: Owens-Brockway Glass Container Inc., Perrysburg, OH (US)

(72) Inventors: Edward A. Grant, Toledo, OH (US); Brian J. Chisholm, Sylvania, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 13/892,727

(22) Filed: May 13, 2013

(65) Prior Publication Data

US 2014/0332535 A1   Nov. 13, 2014

(51) Int. Cl.
| | |
|---|---|
| *B65D 41/50* | (2006.01) |
| *B65D 53/02* | (2006.01) |
| *F16J 15/02* | (2006.01) |
| *B65D 77/20* | (2006.01) |

(52) U.S. Cl.
CPC .............. *B65D 53/02* (2013.01); *F16J 15/02* (2013.01); *B65D 77/202* (2013.01)
USPC ............ 220/378; 220/359.1; 220/359.4; 215/232; 215/250; 215/344; 215/354; 215/258

(58) Field of Classification Search
CPC ............. B65D 17/12; B65D 17/00; B65D 2101/0092; B65D 2101/0046; B65D 2101/003; B65D 3/14; B65D 2543/0037; B65D 2543/00435
USPC ........... 220/378, 266, 268, 270, 643, 359.2, 220/359.4, 276, 252, 254, 359, 359.1; 215/232, 250, 277, 317, 324, 258, 344, 215/354; 229/123.1, 43, 125.13; 53/471, 53/478, 420; 156/69; 428/35, 81
See application file for complete search history.

(56) References Cited

U.S. PATENT DOCUMENTS

| | | | | |
|---|---|---|---|---|
| 1,047,302 | A | * | 12/1912 | Roystone ........................ 53/476 |
| 2,711,840 | A | * | 6/1955 | Gits et al. ...................... 220/780 |
| 3,254,785 | A | * | 6/1966 | Lovell ............................ 215/305 |
| 3,441,161 | A | * | 4/1969 | Van Baarn .................... 215/235 |
| 3,874,580 | A | | 4/1975 | Weatherhead, III |
| 4,044,941 | A | * | 8/1977 | Knudsen .................... 220/258.3 |

(Continued)

FOREIGN PATENT DOCUMENTS

| | | |
|---|---|---|
| EP | 1092639 | 4/2001 |
| EP | 1731441 | 12/2006 |

(Continued)

OTHER PUBLICATIONS

PCT Search Report and Written Opinion, Int. Serial No: PCT/US2014/036595, Int. Filing Date: May 2, 2014, Applicant: Owens-Brockway Glass Container Inc., Mail Date: Oct. 14, 2014.

*Primary Examiner* — Bryon Gehman
*Assistant Examiner* — Gideon Weinerth

(57) ABSTRACT

A seal ring for sealing a container. A seal ring has a base and a longitudinal axis extending therethrough, a radially outer portion, and an inner seal. The radially outer portion has a locking band that is configured to lock beneath an external engagement element of a container so as to secure the seal ring thereto. The inner seal is configured to be biased into sealing engagement with an inner finish surface of the container. The seal ring may be part of a package that also includes a container having a finish that comprises a sealing lip, an external engagement element, and an inner surface, and a foil sealingly and removably coupled to the base of the seal ring.

24 Claims, 2 Drawing Sheets

(56) References Cited

U.S. PATENT DOCUMENTS

| | | | |
|---|---|---|---|
| 4,087,018 A | 5/1978 | Tebbutt | |
| 4,094,460 A * | 6/1978 | Scanga et al. | 229/123.1 |
| 4,096,963 A * | 6/1978 | Rumball | 215/317 |
| 4,114,668 A | 9/1978 | Hickey | |
| 4,180,961 A * | 1/1980 | Collins, III | 53/421 |
| 4,378,892 A | 4/1983 | Ochs et al. | |
| 4,380,304 A * | 4/1983 | Anderson | 220/782 |
| 4,396,655 A | 8/1983 | Graham et al. | |
| 4,694,969 A * | 9/1987 | Granat | 215/252 |
| 4,771,903 A | 9/1988 | Levene et al. | |
| 4,934,554 A * | 6/1990 | Edwards | 220/266 |
| RE33,265 E * | 7/1990 | Gregory et al. | 215/252 |
| 5,125,528 A * | 6/1992 | Heyn et al. | 220/269 |
| 5,246,134 A * | 9/1993 | Roth et al. | 220/359.2 |
| 5,511,680 A * | 4/1996 | Kinne | 206/276 |
| 5,634,567 A * | 6/1997 | Hekal | 220/359.3 |
| 5,647,501 A * | 7/1997 | Helms | 220/780 |
| 5,839,592 A | 11/1998 | Hayes | |
| 5,904,259 A * | 5/1999 | Hidding et al. | 215/232 |
| 5,954,215 A * | 9/1999 | Alter | 215/318 |
| 6,152,316 A * | 11/2000 | Niese | 215/252 |
| 6,193,094 B1 * | 2/2001 | Diamond et al. | 220/254.1 |
| 6,258,312 B1 * | 7/2001 | Heyn | 264/252 |
| 6,382,444 B1 * | 5/2002 | Nyman | 215/252 |
| 6,491,175 B1 * | 12/2002 | Taha | 215/252 |
| 6,637,176 B1 * | 10/2003 | Krall | 53/420 |
| 6,881,286 B2 * | 4/2005 | Drummond et al. | 156/69 |
| 6,974,046 B2 * | 12/2005 | Shenkar | 215/252 |
| 7,597,213 B2 * | 10/2009 | McDonald | 221/46 |
| 7,743,952 B2 * | 6/2010 | Auer et al. | 222/570 |
| 7,823,736 B1 | 11/2010 | Pugne et al. | |
| 8,287,220 B2 | 10/2012 | Oberholzer et al. | |
| 8,308,021 B2 * | 11/2012 | Turvey et al. | 220/793 |
| 2005/0189351 A1 | 9/2005 | Clarke | |
| 2005/0269339 A1 * | 12/2005 | Ciccone | 220/795 |
| 2007/0221605 A1 * | 9/2007 | Pugne et al. | 215/235 |
| 2007/0272693 A1 | 11/2007 | Richards | |
| 2009/0032535 A1 | 2/2009 | Dunwoody et al. | |
| 2009/0065467 A1 * | 3/2009 | Heyn | 215/317 |
| 2012/0234835 A1 * | 9/2012 | Minnette | 220/359.2 |
| 2014/0076889 A1 * | 3/2014 | Stolzman et al. | 220/1.5 |

FOREIGN PATENT DOCUMENTS

| | | |
|---|---|---|
| FR | 2927612 | 8/2009 |
| NL | 1026904 | 2/2006 |
| WO | 2007099066 | 9/2007 |
| WO | 2010130361 | 11/2010 |

* cited by examiner

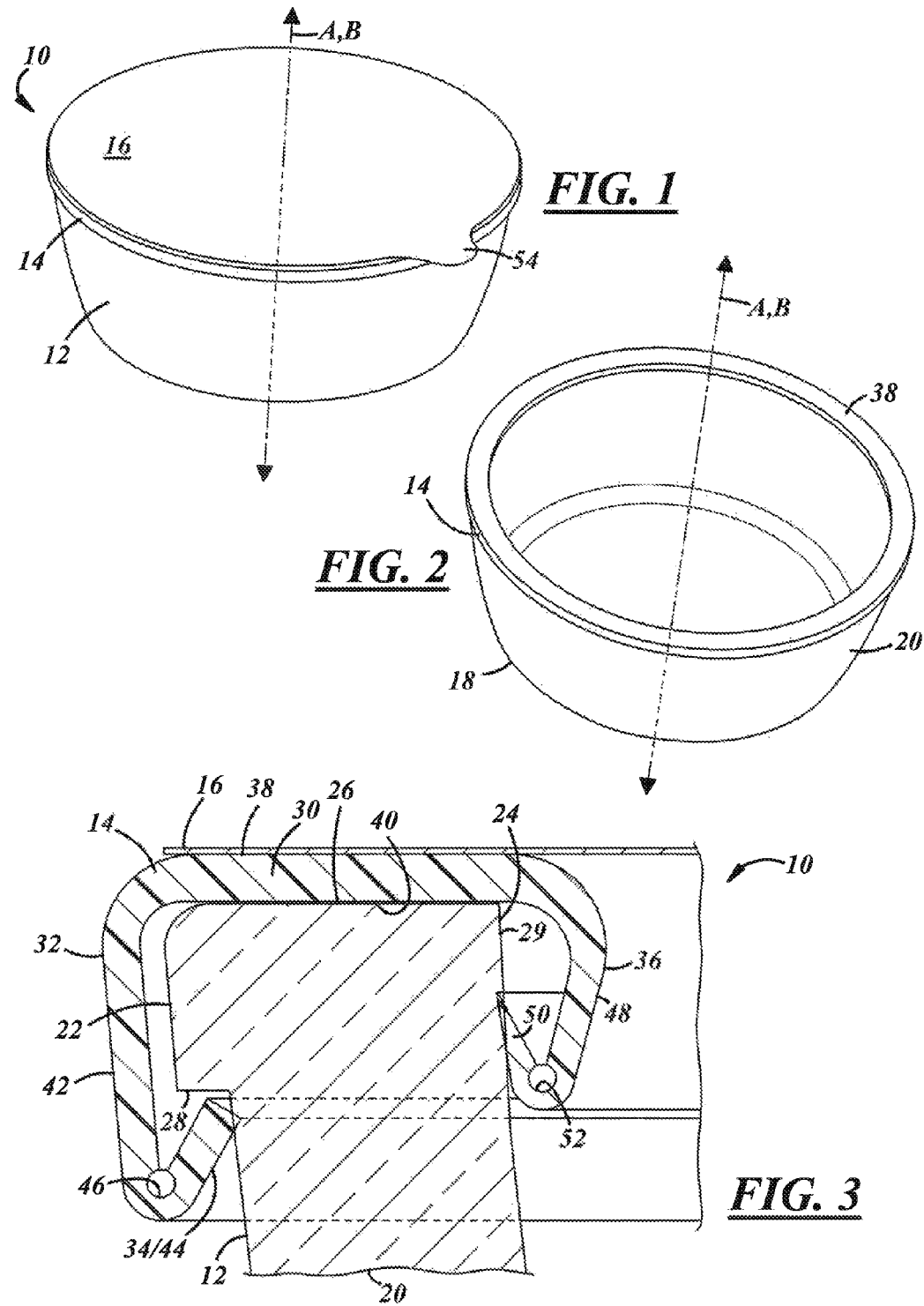

SEAL RING FOR SEALING A CONTAINER

The present disclosure relates to seal rings and, more particularly, to seal rings for sealing containers, for example, glass containers.

BACKGROUND AND SUMMARY OF THE DISCLOSURE

Glass containers often include a base, a finish, and a body extending therebetween. The container finish, in turn, includes a sealing surface to which a removable foil may be secured in order to seal the container. Prior to securing the foil to the sealing surface, the sealing surface is conventionally prepared by, for example, applying a cold end coating thereto. The coating may be applied in a number of ways including by spray- or roller-coating.

A general object of the present disclosure is to provide a foil-sealed container that does not require that a cold end coating be applied to a sealing surface of the container finish to prepare the sealing surface for securing the foil thereto.

The present disclosure embodies a number of aspects that can be implemented separately from or in combination with each other.

A package, in accordance with one aspect of the present disclosure, includes a container including a longitudinal axis extending therethrough and having a finish comprising a sealing lip, an external engagement element, and an inner surface. The package further includes a seal ring having a base overlying the sealing lip, a radially outer portion with a locking band locked beneath the external engagement element of the container finish, and an inner seal biased into sealing engagement with the inner surface of the container finish. The package still further includes a foil sealingly and removably coupled to the base of the seal ring.

In accordance with another aspect of the present disclosure, a seal ring for sealing a container includes a base having a longitudinal axis extending therethrough, an outer portion with a locking band configured to lock beneath an external engagement element of a container, and an inner seal configured to be biased into sealing engagement with a an inner finish surface of the container.

In accordance with a further aspect of the present disclosure, a method of assembling a container and a seal ring includes heating at least a portion of the container to a predetermined temperature sufficient to cause at least a portion of the seal ring to melt when coupled to the container, and coupling the seal ring to a finish of the container when the container is at the predetermined temperature such that a portion of the seal ring melts and conforms to a sealing surface of the container finish.

BRIEF DESCRIPTION OF THE DRAWINGS

The disclosure, together with additional objects, features, advantages and aspects thereof, will best be understood from the following description, the appended claims and the accompanying drawings, in which:

FIG. 1 is a perspective view of a package in accordance with an illustrative embodiment of the present disclosure, and including a container, a seal ring, and a foil sealingly and removably coupled to the seal ring;

FIG. 2 is a perspective view of a container of the package of FIG. 1 having a seal ring assembled therewith;

FIG. 3 is a fragmentary sectional view of one illustrative embodiment of the package of FIG. 1, illustrating the package in an assembled and sealed condition.

DETAILED DESCRIPTION OF PREFERRED EMBODIMENTS

Figure 4:
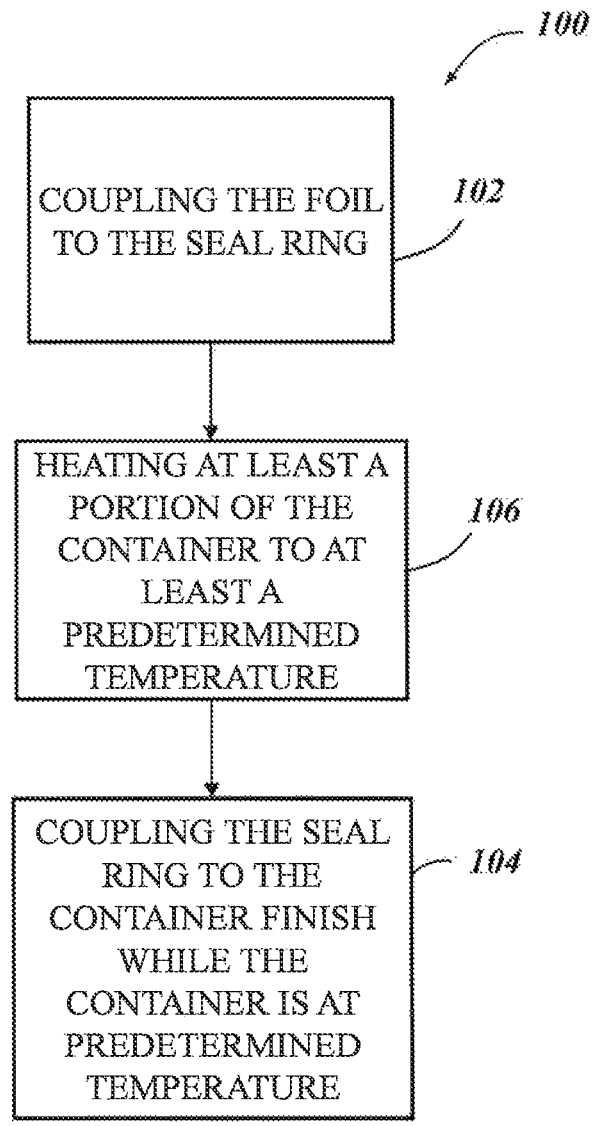
FIG. 4 is a flow chart depicting an illustrative embodiment of a method of assembling a container and a seal ring.

FIG. 1 illustrates a package 10 including a container 12, a seal ring 14 coupled to or assembled with the container 12, and a foil 16 sealingly and removably coupled to the seal ring 14. As described in U.S. patent application Ser. No. 13/892,775, filed on May 13, 2013, assigned to the assignee hereof, and hereby incorporated herein by reference in its entirety, the seal ring 14 and the foil 16 are configured to close and seal the container 12 when the foil 16 is coupled to the seal ring 14, and the seal ring 14 is assembled with the container 12. The package 10 may be used to package any number of goods or products. For instance, the package 10 may be used to package food products, for example and without limitation, pickles, baby food, salsa, peppers, spaghetti sauces, and jams, to cite a few possibilities. The package 10 also may be used to package products other than food products, including, but not limited to, liquids, gels, powders, particles, and the like. Each of the container 12 and the seal ring 14 include or define a respective longitudinal axis (i.e., longitudinal axis A, in the case of container 12; and longitudinal axis B, in the case of seal ring 14) that are coincident with each other when the container 12 and the seal ring 14 are assembled together as illustrated in FIGS. 1 and 2.

The container 12 may be composed of glass or any other material suitable for containing food products, and may comprise a bowl, a jar, or a cup, to cite a few possibilities. With reference to FIG. 2, the container 12 includes a base 18 and a body 20 extending from the base 18. In certain embodiments, the container 12 also may include a shoulder (not shown) extending from the body 20 and a neck (not shown) extending from the shoulder or directly from the body 20. In any event, and with reference to FIG. 3, the container 12 further comprises a finish 22 extending axially from the body 20 that includes an open mouth 24 surrounded by a sealing lip or surface 26. As illustrated in FIG. 3, the sealing surface 26 is an axially-facing surface that faces away from the container body 20, and is configured for engagement with corresponding portion of the seal ring 14, as will be described below. In addition to the mouth 24, the container finish 22 further includes an external or radially outwardly extending engagement element 28 that surrounds the mouth 24 and that is configured to engage a portion of the seal ring 14 when the container 12 and seal ring 14 are assembled together. As used herein, the term "radial" includes oriented generally perpendicular to an axis but is not limited to a direction strictly perpendicular to the axis. The engagement element 28 may comprise, for example and without limitation, a bead (e.g., crown bead), a flange, a lip, or other suitable feature. In any event, the engagement element 28 may extend completely circumferentially around the container finish 22; alternatively, it may comprise multiple discontinuous segments disposed about the circumference of the finish 22. The container finish 22 still further includes an inner, radially inwardly-facing surface 29 that, in an embodiment, is also configured to engage a portion of the seal ring 14 when the container 12 and the seal ring 14 are assembled together.

The seal ring 14 may be of an integral one-piece construction, or of a multiple-piece construction, and may be composed of metal, plastic, or any other material suitable for closing and sealing a container in the manner described herein. As shown in FIG. 3, the seal ring 14 includes a base 30, a radially outer portion 32 having a locking band 34, and an inner seal 36. When seal ring 14 is assembled with the container 12, the ring 14 encircles the mouth 24 of the container 12. More particularly, the base 30 overlies a periphery of the mouth 24 (i.e., at least a portion of the container finish sealing surface 26), the locking band 34 of the radially outer portion 32 locks under or beneath the engagement element 28, and the inner seal 36 is biased into sealing engagement with the mouth 24 or the inner finish surface 29. Seal ring 14 is annular with an inner diameter or opening or radially inner periphery, and an outer diameter or radially outer periphery. Additionally, in an embodiment, the seal ring 14 may be applied to the container 12 when the sealing surface 26 thereof has a tin oxide coating but not a cold end coating that is conventionally required for the foil-sealing of glass containers.

The base 30 includes a first or top surface 38, and a second or undersurface 40 opposite the top surface 38. The top surface 38 is an axially-facing surface and comprises a sealing surface to which, as will be described below, the foil 16 may be coupled. The undersurface 40 is also an axially-facing surface, however, it faces in an axial direction that is opposite that in which the top surface 38 faces (i.e., the top surface 38 and the undersurface 40 face in opposite directions). When the seal ring 14 is assembled with the container 12, the undersurface 40 is disposed adjacent to and, in at least one embodiment, engages, the sealing surface 26 of the container finish 22 surrounding the mouth 24. The longitudinal axis B of the seal ring 14 extends perpendicular to a plane extending along one of the base surfaces 38, 40, and centrally with respect to the outer radial periphery of the seal ring 14.

The radially outer portion 32 of the seal ring 14 is operative to couple the seal ring 14 with the container 12. In an embodiment, the radially outer portion 32 includes a first portion 42 and a second portion 44. The first portion 42 extends away from the base 30 in an axial direction (e.g., in an axial downward direction) such that it is generally perpendicular to the base 30. As used herein, the term "axial" includes oriented generally along an axis but is not limited to a direction strictly parallel to the axis. The second portion 44, which comprises the locking band 34 of the radially outer portion 32, is disposed at a distal end of the first portion 42 that is opposite the base 30, and extends therefrom in both a radially inward direction and an axial direction toward the base 30 (e.g., in an axial upward direction) such that it extends along a predetermined angle from the first portion 42 back toward the base 30 in a radially inward direction. The radially outer portion 32 further may include a foldable seam 46 molded into the seal ring 14 and disposed between the first and second portions 42, 44. In cross-section, the foldable seam 46 is a semi-circular relief in a junction or bight between the first and second portions 42, 44. The foldable seam 46 is configured to allow for the folding or deflection of the second portion 44 in the manner described in greater detail below. The second portion 44 of the radially outer portion 32, which in an embodiment comprises the locking band 34, is configured such that when the seal ring 14 is assembled with the container 12, it "snaps" over and locks beneath the engagement element 28 of the container finish 22 to couple the seal ring 14 with the container 12 (i.e., the ring 14 is snap-fit over the engagement element 28). As such, the second portion or locking band 34/44, and/or the first portion 42, of the radially outer portion 32 may be foldable or elastically deformable to allow for the coupling of the seal ring 14 to the container 12. In one embodiment, the radially outer portion 32 is disposed at the radially outermost point of the base 30, though the present disclosure is not limited to such an arrangement. Additionally, in an embodiment, the coupling or assembly of the seal ring 14 with the container 12 renders the seal ring 14 substantially non-removable from the container 12, meaning that, by design intent, the seal ring 14 is not intended to be removed from the container 12 without destroying or at least damaging the container 12 and or the seal ring 14.

With continued reference to FIG. 3, the inner seal 36 of the seal ring 14 is operative, at least in part, to provide a seal for the container 12. The seal 36 may comprise any number of seals, such as, for example, a plug seal, a valve seal, or any other suitable seal. For purposes of illustration, the description below will be with respect to an embodiment wherein the inner seal 36 comprises a valve seal (i.e., "inner valve seal 36"), though the present disclosure is not limited to such an embodiment. One benefit of a valve seal, among potentially others, is that it is configured such that the seal created thereby is improved with the application of a vacuum to the interior of the container 12 (e.g., as the pressure inside the container 12 decreases, the seal formed between the inner valve seal 36 and the container 12 is tightened).

In an embodiment, and as with the radially outer portion 32 described above, the inner valve seal 36 includes a first portion 48 and a second portion 50. The first portion 48 extends away from the base 30 in an axial direction (e.g., in an axial downward direction) and, in an embodiment, is generally perpendicular to the base 30. In other embodiments, the first portion 48 extends from the base 30 in both an axial direction and a radially outward direction (as shown in FIG. 3) such that the first portion 48 extends at a less than 90° angle from the base 30. The second portion 50 is disposed at a distal end of the first portion 48 that is opposite the base 30, and extends therefrom in both a radially outward direction and axial direction toward the base 30 (e.g., in an axial upward direction) such that it extends along a predetermined angle from the first portion 48 back toward the base 30 in a radially outward direction. The inner valve seal 36 further may include a foldable seam 52 molded into the seal ring 14 and disposed between the first and second portions 48, 50. In cross-section, the foldable seam 52 is a semi-circular relief in a junction or bight between the first and second portions 48, 50. In other embodiments, the seam 52 may include a thinned materials portion. The foldable seam 52 is configured to allow for the folding or deflection of the second portion 50 in the manner described in greater detail below. The second portion 50 is configured such that when the seal ring 14 is assembled with the container 12, it is biased into sealing engagement with the mouth 24 or the inner finish surface 29 of the container 12, thereby forming a liquid and/or air tight seal between the seal ring 14 and the container 12. As such, the second portion 50, and/or the first portion 48, of the inner valve 36 may be foldable or elastically deformable to allow for the sealing of the container 12. In one embodiment, the inner valve seal 36 extends from a radially innermost point of the base 30, though the present disclosure is not limited to such an arrangement.

As briefly described above, the package 10 further includes the foil 16 that is sealingly and removably coupled to the seal ring 14 and that serves to seal the container 12 when the seal ring 14 and container 12 are assembled together. The foil 16 may be composed of any number of materials suitable for hermetically sealing the container 12, including, for example and without limitation, a metallic material (e.g., aluminum), a polymeric or plastic material (e.g., polyethylene terephthalate (PET), a paper material (e.g., wax paper), or other material or substrate suitable to form a seal. In the embodiment illustrated in FIG. 3, the foil 16 is removably and sealingly coupled to the base 30 of the seal ring 14, and more particularly, to the top surface 38 of the base 30, which thereby serves as a sealing surface of both the seal ring 14 and the package 10 when the seal ring 14 is assembled with the container 12. The foil 16 and the material of the seal ring 14 are closely matched to achieve optimal performance, and the foil 16 may be coupled to the base 30 of the seal ring 14 using any number of techniques, including, for example, induction and conduction sealing techniques, and/or any other suitable technique known in the art. The foil 16 may be coupled to the seal ring 14 prior to assembling or coupling the seal ring 14 with the container 12, or alternatively, thereafter. As illustrated in FIG. 1, foil 16 may include a tab 54 extending from the periphery thereof that is configured to allow a user to remove the foil 16 from the seal ring 14 by pulling the tab 54 away from the seal ring 14 and the container 12.

With reference to FIGS. 3 and 4, an illustrative method 100 of assembling the package 10 will now be described.

In a step 102, the foil 16 is coupled to the base 30 of the seal ring 14. In one embodiment, step 102 is performed prior to the seal ring 14 being coupled to or assembled with the container 12, while in another embodiment step 102 is performed after the seal ring 14 and container 12 are assembled together.

In any event, in a step 104, the seal ring 14 is aligned with the mouth 24 and the sealing surface 26 of the container finish 22, and is then pressed in an axial direction onto the container finish 22. As the locking band 34 of the seal ring 14 contacts the engagement element 28, it deflects or folds in a radially outward direction until it reaches the bottom portion of the engagement element 28, at which point it reflects hack to at least close to its original position and locks beneath the engagement element 28. Similarly, as the seal ring 14 is pressed onto the container 12, the second portion 50 of the inner valve seal 36 contacts the mouth 24 of the container finish 22 and folds or deflects in a radially inward direction into sealing engagement with the mouth 24 or the inner finish surface 29 of the container finish 22. The second portion 50 remains biased against the mouth 24 and/or the inner finish surface 29 to create a seal between the seal ring 14 and the container 12. In an exemplary embodiment, step 104 is performed when the material of the container 12 is at a temperature sufficient to cause at least a portion of the base 30 of the seal ring 14 to melt and more completely conform to the sealing surface 26 of the container finish 22 to form a more complete seal between the seal ring 14 and the container 12 (e.g., the seal ring 14 will conform to imperfections in the sealing surface 26, for example).

Accordingly, in an embodiment, the method 100 may further comprise a step 106 of heating the container 12, or at least the portion thereof that includes the container finish 22, to a predetermined temperature sufficient to cause a desired amount of melting of the seal ring 14 prior to performing step 104. In an embodiment, step 106 may be performed during, or comprise a part of, the container manufacturing process where the residual heat from that process is sufficient to cause at least a portion of the seal ring 14 to melt. In another embodiment, step 106 may be independent of the container manufacturing process and may comprise applying heat to the container 12, or at least a portion thereof, immediately prior to performing the step 104 of the method 100. In either case, the particular temperature required to sufficiently and acceptably melt the seal ring 14 is dependent upon the particular materials of which the seal ring 14 and/or the container 12 is/are formed, and may be empirically determined by testing different materials and combinations of materials to achieve the desired amount of seal ring melting.

There thus has been disclosed a package that fully satisfies one or more of the objects and aims previously set forth. The disclosure has been presented in conjunction with an illustrative embodiment, and modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A package that includes:
    a glass container including a longitudinal axis extending therethrough and having a finish comprising a sealing lip, an external engagement element, and an inner surface;
    a plastic seal ring having a base overlying said lip, a radially outer portion with a locking band locked beneath said engagement element, and an inner seal comprising a first portion extending away from said base of said seal ring in an axial direction and a second portion extending from an end of said first portion opposite said base in both a radially outward direction and an axial direction toward said base, and further wherein said second portion is biased into sealing engagement with said inner finish surface; and
    a foil sealingly and removably coupled to said base of said seal ring,
    wherein said radially outer portion of said seal ring is snap-fit over said engagement element of said container to lock said locking band beneath said engagement element.

2. The package set forth in claim 1, wherein said base of said seal ring comprises a top surface and an undersurface opposite said top surface, and further wherein said top surface comprises a sealing surface to which said foil is coupled and said undersurface is disposed adjacent to the sealing lip of said container.

3. The package set forth in claim 1, wherein said radially outer portion of said seal ring comprises a first portion extending away from said base in an axial direction and a second portion extending from an end of said first portion opposite said base in both a radially inward direction and an axial direction toward said base, said second portion comprising said locking band.

4. The package set forth in claim 3, wherein said radially outer portion further comprises a foldable seam disposed between the first and second portions thereof configured to allow for the folding of said second portion.

5. The package set forth in claim 1, wherein said inner seal further comprises a foldable seam disposed between said first and second portions thereof configured to allow for the folding of said second portion.

6. The package of claim 1, wherein said seal ring is of integral one-piece construction, and said base of said seal ring comprises a top sealing surface to which said foil is directly coupled and an undersurface opposite said top surface and melted directly to said sealing lip of said container.

7. The package of claim 6, wherein said seal ring is substantially non-removable from said container.

8. A seal ring for sealing a container, and including:
    a base and a longitudinal axis extending therethrough;
    an outer portion with a locking band configured to lock beneath an external engagement element of a container, wherein said outer portion comprises a first portion extending away from said base in an axial direction and a second portion extending from an end of said first portion opposite said base in both a radially inward direction and an axial direction toward said base, said second portion comprising said locking band; and
    an inner seal comprising a first portion extending away from said base of said seal ring in an axial direction and a second portion extending from an end of said first portion opposite said base in both a radially outward direction and an axial direction toward said base, and further wherein said second portion is configured to be biased into sealing engagement with an inner finish surface of the container, wherein said inner seal further comprises a valve seal comprising a foldable seam disposed between said first and second portions thereof configured to allow for the folding of said second portion.

9. The seal ring set forth in claim 8, further comprising a foil removably coupled to said base.

10. The seal ring set forth in claim 9, wherein said base comprises a top surface and an undersurface opposite said top surface, and further wherein said foil is coupled to said top surface.

11. The seal ring set forth in claim 8, wherein at least one of said first and second portions of said inner seal is elastically deformable.

12. The seal ring set forth in claim 8, wherein said base, outer portion, and inner seal thereof are formed of plastic.

13. The seal ring of claim 8, wherein said inner seal extends from a radially innermost point of said base.

14. The seal ring of claim 8, wherein said foldable seam includes a semi-circular relief in a bight between said first and second portions of said inner seal.

15. A package that includes:
a glass container including a longitudinal axis extending therethrough and having a finish comprising a sealing lip, an external engagement element, and an inner surface;
a plastic seal ring having a base overlying said lip, a radially outer portion with a locking band locked beneath said engagement element, and an inner seal comprising a first portion extending away from said base of said seal ring in an axial direction and a second portion extending from an end of said first portion opposite said base in both a radially outward direction and an axial direction toward said base, and further wherein said second portion is biased into sealing engagement with said inner finish surface; and
a foil sealingly and removably coupled to base of said seal ring,
wherein said radially outer portion of said seal ring is snap-fit over said engagement element of said container to lock said locking band beneath said engagement element, and wherein said outer portion further comprises a foldable seam disposed between said first and second portions thereof configured to allow for the folding of said second portion.

16. The seal ring set forth in claim 15, wherein at least one of said first and second portions of said outer portion is elastically deformable.

17. A package, comprising:
a glass container including a sealing lip, an external engagement element, and an inner surface;
a plastic seal ring coupled to the container, and including a base having a top surface, an outer locking band, and an inner seal; and
a foil sealingly and removably coupled to the top surface of the seal ring;
wherein the outer locking band of the seal ring comprises an outer first segment extending away from the base in an axial direction, an outer second segment extending out from an end of the outer first segment opposite the base in a radially inward direction to contact the external engagement element of the container, and a foldable seam between the outer first and second segments;
wherein the inner seal of the seal ring comprises an inner first segment extending away from the base in an axial direction, an inner second segment extending from an end of the inner first segment opposite the base in a radially outward direction and an axial direction toward the base and configured to be biased into sealing engagement with the inner surface of the container, and a foldable seam between the inner first and second segments.

18. The package set forth in claim 17, wherein said base of said plastic seal ring comprises a top surface and an undersurface opposite said top surface, and further wherein said top surface comprises a sealing surface to which said foil is coupled and said undersurface is disposed adjacent to the sealing lip of said glass container.

19. The package set forth in claim 17, wherein said outer portion of said plastic seal ring is snap-fit over said engagement element of said container to lock said locking band beneath said engagement element.

20. The package set forth in claim 17, wherein said inner seal comprises a valve seal.

21. The package of claim 17, wherein said plastic seal ring is of integral one-piece construction, said foil is directly coupled to said top surface of said base, and said base also has an undersurface opposite said top surface and melted directly to said sealing lip of said glass container.

22. The package of claim 21, wherein said plastic seal ring is substantially non-removable from said glass container.

23. The package of claim 17, wherein said inner seal extends from a radially innermost point of said base.

24. The package of claim 17, wherein said foldable seam of said inner seal includes a semi-circular relief in a bight between said first and second segments.

* * * * *